Aug. 7, 1962     L. S. GUARINO ET AL     3,048,836
HELICOPTER INTEGRATED DIRECTOR EQUIPMENT
Filed April 26, 1961     4 Sheets-Sheet 1
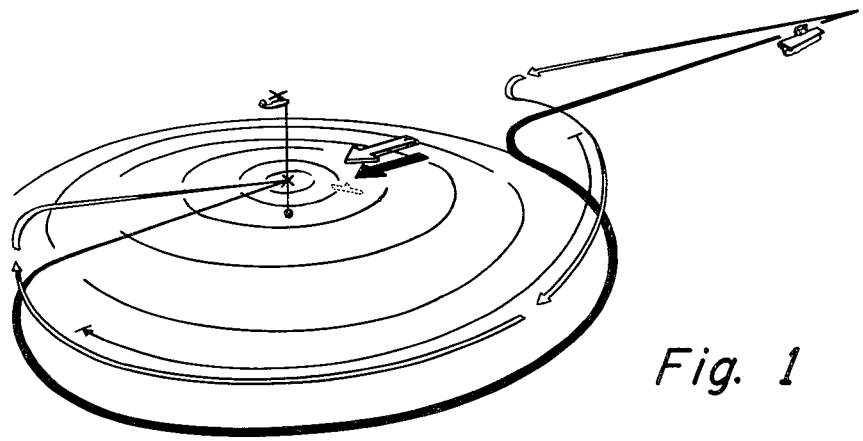
Fig. 1
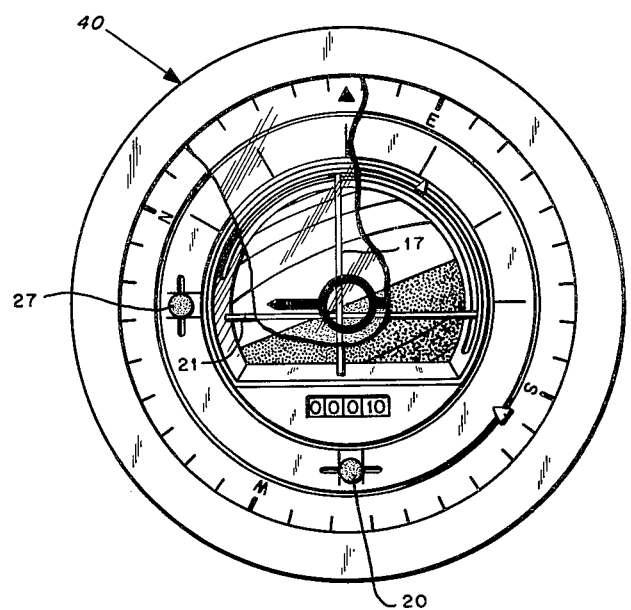
Fig. 2
INVENTORS
LOUIS S. GUARINO
WILLIAM M. OGDEN
BY
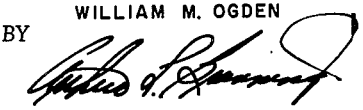
ATTORNEY

INVENTORS
LOUIS S. GUARINO
WILLIAM M. OGDEN
BY
ATTORNEY

Aug. 7, 1962 L. S. GUARINO ET AL 3,048,836
HELICOPTER INTEGRATED DIRECTOR EQUIPMENT
Filed April 26, 1961 4 Sheets-Sheet 3

INVENTORS
LOUIS S. GUARINO
WILLIAM M. OGDEN
BY
ATTORNEY

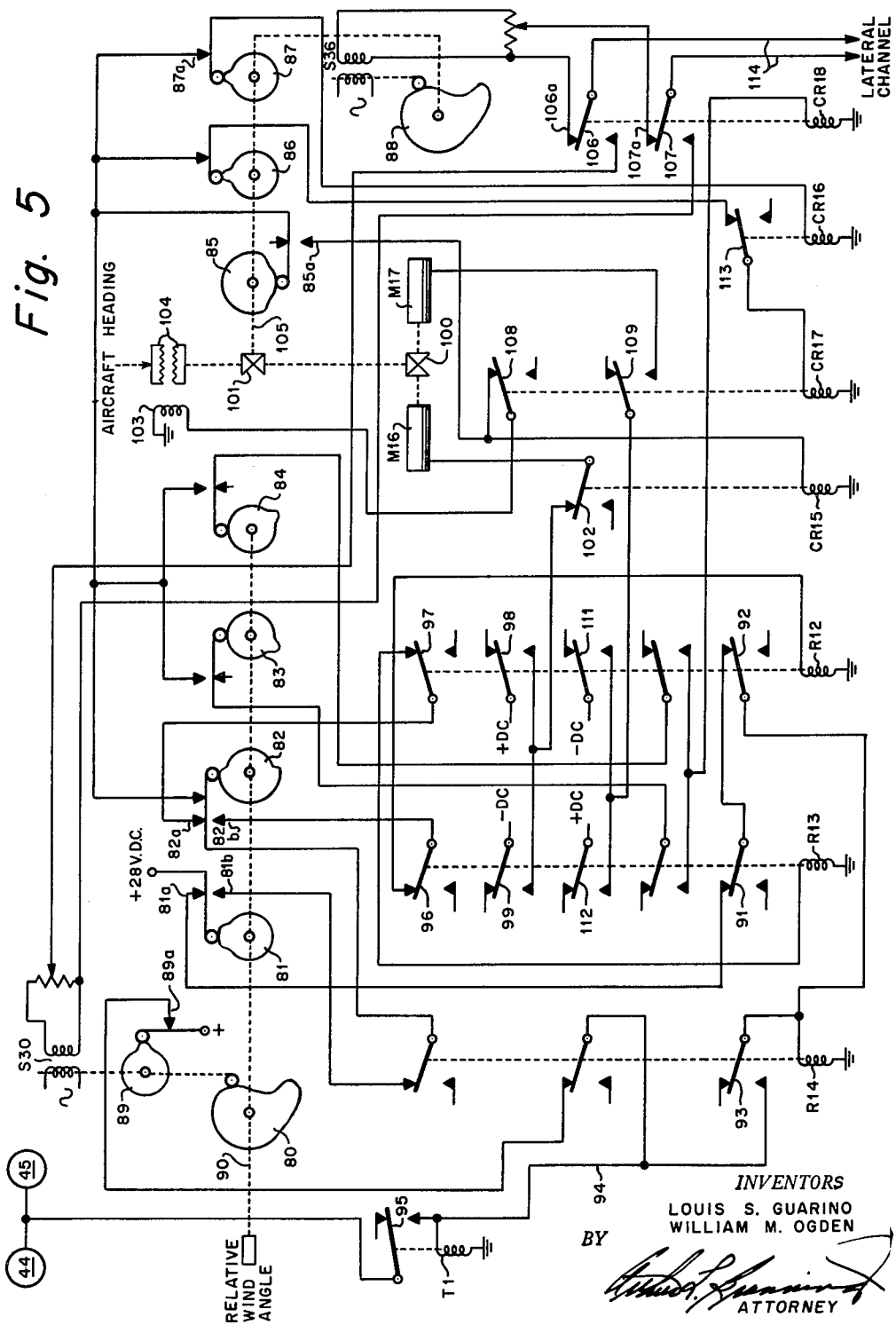

United States Patent Office 3,048,836
Patented Aug. 7, 1962

3,048,836
HELICOPTER INTEGRATED DIRECTOR
EQUIPMENT
Louis S. Guarino, Hatboro, and William M. Ogden, Newtown Square, Pa., assignors to the United States of America as represented by the Secretary of the Navy
Filed Apr. 26, 1961, Ser. No. 105,000
12 Claims. (Cl. 343—7)
(Granted under Title 35, U.S. Code (1952), sec. 266)

The invention described herein may be manufactured and used by or for the Government of the United States of America for governmental purposes without the payment of any royalties thereon or therefor.

This invention relates to aircraft indicator systems and more particularly to helicopter integrated director equipment.

Helicopters have been found to be importantly useful in antisubmarine warfare. Given the approximate position of a submarine, a helicopter is dispatched to the approximate position and comes to a hover position directly above the given target position and lowers or dunks a sonar detecting device into the water. This method of detection has been found extremely useful in pinpointing the location of enemy submarines. However, one of the major problems associated with this use of helicopters is the maintenance of course and the maneuvering of the helicopter into the hover position from the time it actually takes off from a ship base to its final hover position particularly in limited or zero visibility conditions. This problem results from the myriad of meters which the pilot must scan in order to maintain the helicopter on its scheduled course. Thus, with the pilot diverting all or most of his time in maintaining the helicopter on course in maneuvering to the target area, there is little or no time left for tactical decisions.

The general purpose of this invention is to provide an integrated instrument and flight director system for helicopters for facilitating the conduction of an ASW dunking sonar mission under all weather conditions.

Therefore, the object of the present invention is to provide an integrated instrument and flight director system for helicopters from which the pilot receives from a centrally located indicator specific instructions as to what to do throughout all phases of an ASW dunking sonar mission in maneuvering a helicopter to a hover position.

Another object of the present invention is to provide a helicopter integrated director system which enables a pilot to accurtaely accomplish an ASW dunking sonar mission under all types of weather conditions including the conditions which cause zero visibility.

Another object of the present invention is to provide a helicopter integrated director system which gives command signals to a pilot throughout all phases of the ASW sonar dunking mission, which include takeoff, cruise, approach and hover.

A further object of the present invention is to provide a helicopter integrated director system which gives the pilot clear, precise and continuous flight instructions from a single indicator on the instrument panel throughout all phases of the mission.

Throughout the consideration of the following specification and the annexed drawings further objects and the features of the invention will become further apparent.

FIG. 1 illustrates the flight pattern of an ASW helicopter from takeoff to final hover position.

FIG. 2 is a sectional illustration of the face portion of the directional indicator used in this invention.

FIG. 5 is a schematic view of the approach mode computer of FIG. 3.

Referring to FIG. 1, there is shown the flight pattern of a helicopter from the time it takes off from an aircraft carrier to the time it assumes a hover position and dunks a sonar cable in the water at a position previously determined to be the target area. By observation of FIG. 1 the flight pattern of the helicopter on an ASW dunking mission may conveniently be broken up into four parts for purposes of this invention, namely, the takeoff and manual cruise mode, the dead reckoning cruise mode, the approach mode initiated at the point of turn, and finally the hover mode.

The manual cruise mode is in operation on takeoff and during the time the helicopter is aloft waiting for instructions from the mother ship. The dead reckoning cruise mode is put into operation when the helicopter is flying in on a target area on a heading generated by automatic dead reckoning equipment which operates on data received directly from the mother ship. When the helicopter comes within 1500 yards of the approximate target area, the approach mode becomes operative, and depending on the relative wind angle, the helicopter heads straight in and descends to a hover position or circles about the target area to a point where it can head into the wind toward the target area. As the helicopter heads in toward the approximate target area it reduces altitude to fifty feet and when it is above the target area, it reduces ground speed to zero. Then the helicopter dunks its sonar equipment and maintains the hover position.

Figure 3:
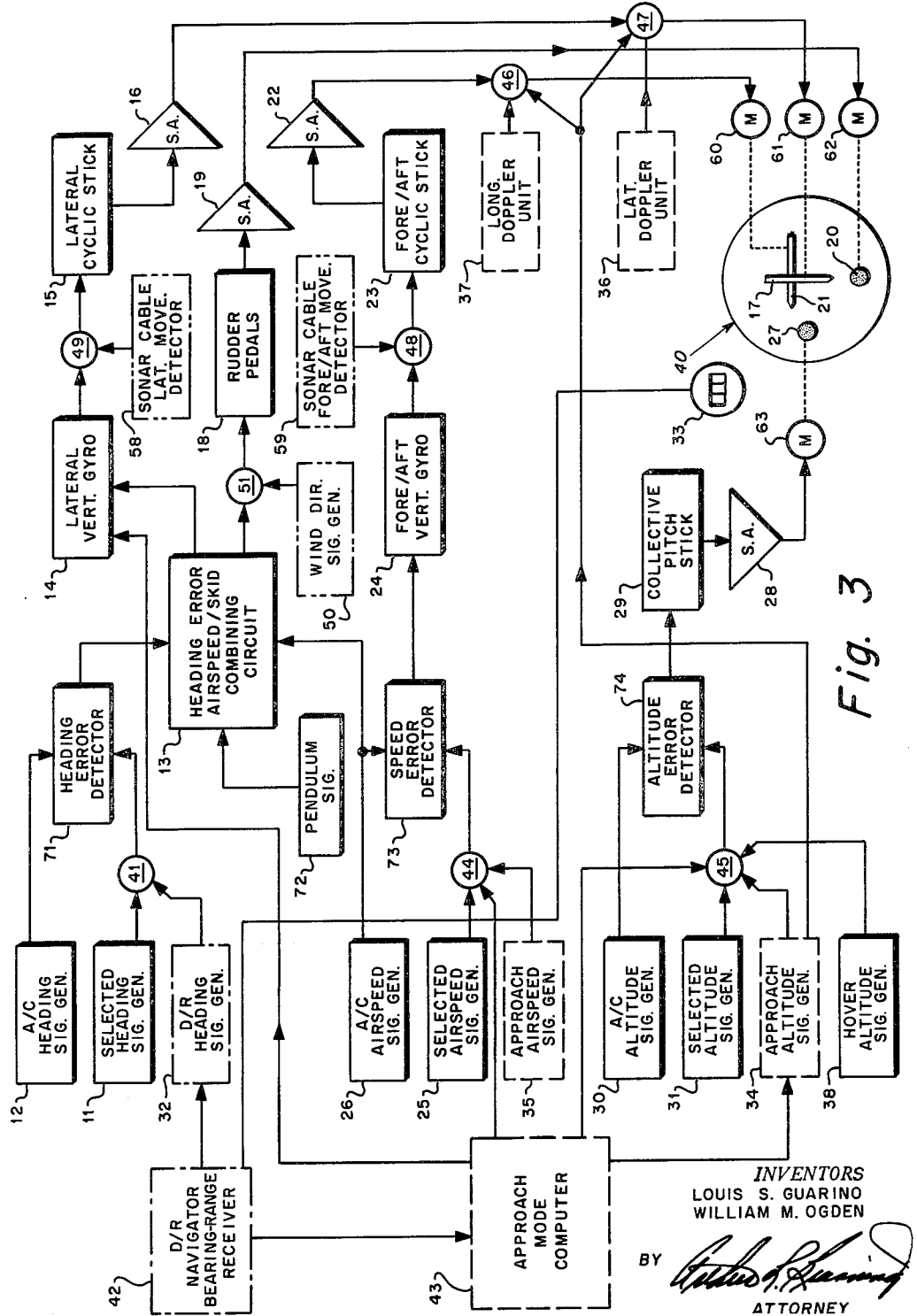
FIG. 3 is a block diagram representing the helicopter integrated director equipment of this invention in its preferred embodiment.

FIG. 3 is a block diagram of the preferred embodiment of the helicopter integrated director equipment of this invention, which directs the pilot sequentially and throughout each mode of the ASW sonor dunking mission. This invention consists of an integrated instrument and computer system with which each mode of the mission is programmed, and which supplies signals to the directional indicator 40 and thereby causes it to indicate to the pilot exactly what to do to maintain helicopter on the programed course at the programed altitude at the programed airspeed. Each mode is divided into four channels consisting of (1) a longitudinal channel in which signals representing selected airspeed and actual airspeed are compared and any difference between the two signals results in a flight director command to change cyclic stick pitch position: (2) a lateral channel in which selected heading is compared with actual heading and any deviation from the selected heading results in a command to change lateral cyclic stick position; (3) rudder channel in which is generated a signal to instruct the pilot to maintain correct dynamic vertical; (4) collective pitch channel in which actual altitude is compared with selected altitude and any deviation from the selected altitude results in a command to change collective pitch stick position.

Each of the flight modes of the helicopter and the associated helicopter integrated director equipment will be discussed in detail beginning with the manual cruise mode, which includes takeoff and flight until such time as the helicopter receives from the mother ship information concerning the approximate whereabouts of a target submarine. At that time the dead reckoning cruise mode is initiated.

The command signals are presented to the pilot on the directional indicator 40 as shown in FIG. 2, which consists of a vertical pointer 17 which on deviation instructs the pilot to correct for heading; a rudder bug 20 which on deviation from center instructs the pilot to depress one or the other rudder pedals to maintain dynamic vertical; horizontal pointer 21 which on deviation from a center position instructs the pilot to move the cyclic stick fore or aft to correct for the speed deviation; an altitude bug 27 which on deviation from center instructs the pilot to operate the collective pitch stick to correct for altitude deviation. The manner, in which each of these elements of the directional indicator 40 receives a signal resulting in the deviation thereof, will now be discussed starting with the manual cruise mode.

It should be noted that the output signals of the four channels are converted into mechanical motion by appropriate servo motors 60, 61, 62, and 63 before application to the various indicators of the directional indicator 40. For convenience in presenting the system, however, the specification will refer to these output signals as being directly applied to the various indicators.

In the lateral channel of the manual cruise mode a signal representative of the selective heading previously determined and put in by the crew is generated in selected heading signal generator 11 and compared in error detector 71 with the actual heading of the aircraft as generated in signal generator 12. The output from detector 71 is indicative of the actual heading deviation from the preselected heading and is an input to combining circuit 13. Combining circuit 13 has a second input from actual airspeed signal generator 26, and a third input from pendulum generator 72. The pendulum generator 72 generates a signal proportional to any slip or skid of the helicopter which may occur as, for example, when a rapid change in heading is made. Since the rate of change of heading of a helicopter is related to skid as a function of speed the actual aircraft airspeed is a necessary input to combining circuit 13. The signal from combining circuit 13 is coupled to a bank sensitive vertical gyro means 14 which generates a signal proportional to bank and algebraically added to the bank signal. The signal from vertical gyro 14 is fed to a servo motor 61 through summing amplifier 16. As a result the vertical pointer 17 deviates from its central position. When vertical pointer 17 deviates from center, the pilot is thereby instructed to move the cyclic stick to one side or the other for the heading deviation. The cyclic stick contained in lateral cyclic stick box 15 is moved an amount to cause the vertical pointer 17 to immediately center and correction of heading error is initiated. As the vertical pointer 17 then deviates from center in the opposite direction, the pilot centers the cyclic stick at the same rate, which cancels out the signal from generator 14 and correct heading is obtained.

Each of boxes 15, 18, 23 and 29 contains a conventional washout mechanism, which is connected to a control stick pickoff and functions to cancel any signal caused by movement of the control sticks or rudder pedals. The signal resulting from stick motion is fed into each of the channels. This signal quickens the display of indicator 40 and gives the pilot an instantaneous indication of the effect of all control movements.

The rudder channel is also coupled to combining circuit 13. With no heading error input to combining circuit 13, any output from combining circuit 13 is indicative of an undesired lateral movement and this signal is fed through amplifier 19 to rudder bug 20 which then deviates from center. Depending on the direction of deviation of bug 20, the pilot will hit one or the oher of rudder pedals 18 for correction of the undesired lateral movement. Immediately upon depressing a rudder pedal the proper amount, the rudder bug 20 will center, and as the rudder bug moves in the opposite direction, the pilot will slowly release rudder pedal and the helicopter is then corrected for undesired lateral movement and is righted to a dynamic vertical position.

However, since lateral movement of a helicopter is also a function of airspeed, a portion of the skid signal as determined by airspeed is fed to the lateral channel and results in vertical pointer 17 deviation from center. Thus, when a correction is called for in the rudder channel, a complementary correction must be made in the lateral channel for heading. Conversely, with no skid signal input to combining circuit 13, any correction for heading error in the lateral channel must be accompanied by a complementary skid correction in the rudder channel depending on airspeed. For the general case when heading error and skid signals are present as inputs to combining circuit 13, the signals are summed in the combining circuit 13 and resultant signals are fed to the rudder and lateral channels as more fully described in connection with FIG. 4.

Figure 4:
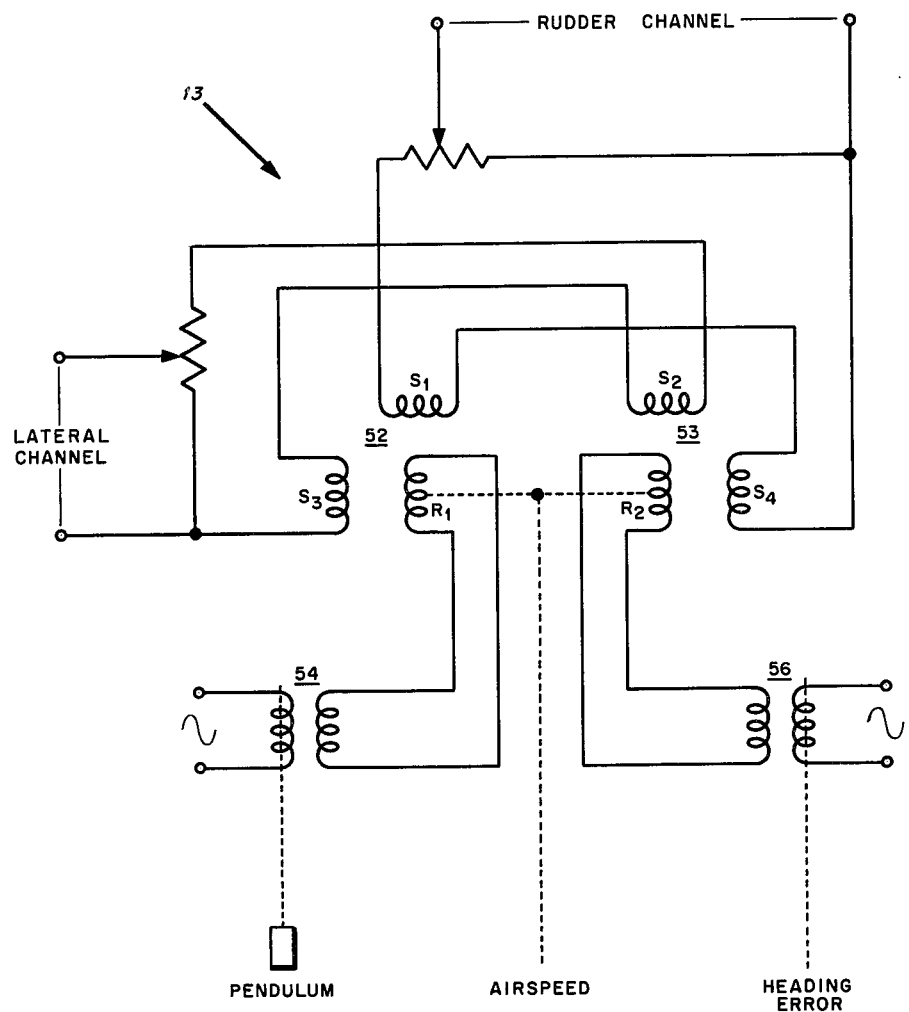
FIG. 4 is a schematic view of the combining circuit of FIG. 3.

Referring to FIG. 4 there is shown in detailed schematic form the combining circuit 13 of FIG. 3. The combining circuit 13 consists of two synchro resolvers 52 and 53. Synchro resolver 52 has a rotor winding $R_1$ and two stator windings $S_1$ and $S_3$. Synchro resolver 53 has a rotor winding $R_2$ and two stator windings $S_2$ and $S_4$. The rotors $R_1$ and $R_2$ have a common mechanical input which rotates each rotor winding an amount proportional to airspeed. In the position shown, that is, with rotor windings $R_1$ and $R_2$ fully coupled to stator windings $S_3$ and $S_4$, respectively, the airspeed input is zero as it would be when the helicopter is hovering. When the helicopter is flying at maximum speed the airspeed input would be such as to cause rotor windings $R_1$ and $R_2$ to be fully coupled to stator windings $S_1$ and $S_2$, respectively. When helicopter airspeed is between zero and maximum speed, the rotor windings couple respective associated stator windings proportionately.

Stator windings $S_3$ and $S_2$ are connected in series and have a combined output which is the algebraic sum of the voltages induced in each winding $S_3$ and $S_2$. This output is the input to vertical gyro signal generator 14 in the lateral channel.

Stator windings $S_1$ and $S_4$ are connected in series and have a combined output which is the algebraic sum of the voltages induced in each winding $S_1$ and $S_4$. This output is the input to the rudder channel from combining circuit 13.

Rotor winding $R_1$ receives an electrical input through linear transformer 54, the rotor of which is driven by a pendulum sensitive to acceleration in a lateral direction. The signal input to rotor winding $R_1$, therefore, is proportional to skid or slip of the helicopter at any given time.

Rotor winding $R_2$ receives an electrical input through linear transformer 56, the rotor of which is driven an amount proportional to heading error. The signal input to rotor winding $R_2$, therefore, is proportional to the heading error of the helicopter at any given time.

When the helicopter is in a hover position, that is, with airspeed equal to zero, the rotors $R_1$ and $R_2$ are in the positions shown in FIG. 4. For this condition all of any skid signal present (equivalent to lateral movement in the hover position) is fed to the lateral channel and is corrected by movement of the lateral cyclic stick. Also all of any heading error signal present is fed to the rudder channel.

When the helicopter is flying at maximum speed, the rotors $R_1$ and $R_2$ are displaced 90° from the position for hover to fully couple stator windings $S_1$ and $S_2$, respectively. For this condition all of any skid signal present is fed to the rudder channel and all of any heading error signal is fed to the lateral channel.

For speeds of the helicopter between zero and maximum, the signals present in rotor windings $R_1$ and $R_2$ are proportionately divided between respective stator windings.

The output from actual aircraft airspeed signal generator 26 is compared with the signal representative of selected airspeed from generator 25 in speed error detector 73. The error signal from detector 73 is fed as an input to vertical gyro pitch signal generator 24 where it is algebraically added to any pitch signal resulting from the momentary attitude of the helicopter as may be present therein. The signal then passes through fore and aft cyclic stick mechanism 23, is amplified in amplifier 22 to cause horizontal pointer 21 to deviate from center according to the speed error. Deviation of horizontal pointer 21 from the center position instructs the pilot to push the stick in a fore or aft direction, whereupon the horizontal pointer is immediately centered. As the pointer 21 deviates in the opposite direction the pilot slowly centers the cyclic stick and cancels out the signal from generator 24 and the speed of the helicopter is corrected.

In order to maintain altitude at the selected value in the manual cruise mode the signal representing actual altitude from signal generator 30 is compared with the signal from signal generator 31 representing selected altitude in error detector 74. The output from error detector 74 is passed through the collective pitch stick mechanism 29, is amplified in amplifier 28 to cause bug 27 to deviate an amount proportional to altitude error. The resulting deviation instructs the pilot to operate the collective pitch stick in the instructed direction whereupon the bug 27 is immediately centered and then slowly moves from center in the opposite direction. When this happens, the pilot centers the stick at the same rate until the bug is finally centered, at which time the helicopter is flying at the selected altitude.

Dead reckoning navigator bearing-range receiver 42 receives information from the mother ship which contains the relative bearing of a target and distance to the target. Therefore, when the receiver 42 begins to receive such information from the mother ship, the pilot then initiates the dead reckoning cruise mode. Since the receiver 42 indicates range to a selected target via meter 33, the pilot is continuously aware of distance to the target. Range meter forms part of indicator 40. The relative bearing of the target received in receiver is applied to dead reckoning signal generator 32 which begins generating a signal proportional to the heading necessary for the helicopter to fly in on target.

The pilot initiates the dead reckoning cruise mode by manually operating switch box 41 to replace selected heading signal generator 11 with dead reckoning signal generator 32 and thereby inserts a new heading in the lateral channel. Once the new heading is inserted into the lateral channel the integrated director equipment operates in a manner identical to that previously discussed in relation to the manual cruise mode.

When the helicopter comes within 1500 yards of the approximate target area, dead reckoning navigator bearing and range receiver 42 pulses or otherwise causes approach mode computer 43 to become energized and initiate the approach mode operation. Alternately, approach mode computer may be manually initiated. The approach mode computer receives wind angle information and, if the relative wind angle with respect to the helicopter is within plus or minus 20°, the approach mode computer directs a straight in approach to hover position. If the relative wind angle with respect to the helicopter is greater than plus or minus 20°, the approach mode computer directs the turn maneuvers necessary for the helicopter to approach the hover position in a headed-into-the-wind direction.

Approach mode computer 43 and the manner in which it is functionally interrelated with the helicopter integrated director equipment of FIG. 3 will be more fully understood by reference to FIG. 5 discussed herein below.

The relative wind angle with respect to the helicopter is a mechanical input such as shaft 90 driven by an appropriate wind sensor and is connected to cams 80 through 84 of approach mode computer 43. For the condition of a relative wind angle less than plus or minus 20° cam 81 is in the position shown, and relay coil R14 is energied from a 28 volt D.C. power supply through contact 81a and switches 91 and 92. When relay coil R14 is energized switch 93 is closed to supply power through conductor 94 to relay coil T1 which after a time delay of 12 seconds causes contacts 95 to close. Power is then supplied to switch boxes 44 and 45 of FIG. 3. As a result of this switch box 44 operates to cause selected airspeed signal generator 25 to be replaced by approach airspeed signal generator 35. Approach airspeed signal generator inserts an airspeed into the longitudinal channel of 55 knots per hour. At the same time switch box 45 operates to replace selected altitude signal generator 31 with approach altitude signal generator 34. Approach altitude signal generator 34 inserts a signal into collective pitch channel to command a descent of 500 feet per second until the helicopter has reached an altitude of 50 feet.

For the condition when the relative wind angle is greater than plus or minus 20° the approach mode computer 43 operates in the following manner. When the angle of wind direction relative to the helicopter is greater than plus or minus 20°, cam 81 will be in a position as determined by the input on shaft 90 whereby power is supplied through contact 81b to one of the two relay coils R12 or R13. If the wind angle is greater than +20°, right turn relay coil R12 is energized through contact 82b and switch 96. If the relative wind angle is greater than −20°, left turn relay coil R13 is energized through contact 82a and switch 97.

Depending upon which of relay coils R13 or R12 is energized, motor M16 will be energized to rotate in a positive direction or a negative direction. When relay coil R12 is energized, switch 98 is closed to energize motor M16 with positive D.C. voltage the motor M16 is rotated in a positive direction. When relay coil R13 is energized, switch 99 is closed to energize motor M16 with negative D.C. voltage and motor M16 rotates in a negative direction.

The mechanical output of motor M16 is connected to differential 101 through differential 100. The output of differential 101 is mechanical and is connected to cams 85 through 88. When cam 85 has been moved through an angle of 90° from the position shown by the output of differential 101 in a positive or negative direction as determined by the energization of motor M16, relay coil R15 is energized through contact 85a. When relay coil R15 is energized, switch 102 is opened to remove power from motor M16. Simultaneously with energization of relay coil R15 coil 103 is energized and operates to close clutch 104 through which a mechanical input representative of aircraft heading is supplied to differential 101.

When the shaft 105 rotates 90° as caused by motor M16, cam 88 rotates the rotor of transformer S36 to insert a voltage into the lateral channel via contacts 106a and 107a which commands a 90° turn of the helicopter in a direction depending on the sign of the relative wind angle. As previously pointed out, as soon as this 90° displacement of shaft 105 has occurred, motor M16 is deenergized by virtue of relay coil R15 being energized. Aircraft heading is transmitted through clutch 104 to erase or wash out the 90° displacement of shaft 105 as the helicopter completes the turn. When the aircraft completes its turn, relay coil R17 is enerized through contact 86a as a result of cam 86 connecting a source of power to it as shown. Energization of relay coil R17 opens switch 108 to deenergize relay coil 103 and disengage clutch 104 thereby taking the aircraft heading out.

On energization of relay coil R17 switch 109 is closed to energize motor M17 in a positive or negative direction depending on which of relay coils R13 or R12 is at that time energized. If relay coil R12 is energized motor M17 is supplied with negative D.C. voltage through switch 111 to cause motor M17 to rotate in a negative direction. If relay coil R13 is energized motor M17 is energized with positive D.C. voltage through contact switch 112 resulting in rotation of motor M17 in a positive direction. When motor M17 causes shaft 105 to rotate 3.5° through differentials 100 and 101, cam 87 causes relay coil R16 to be energized through contact 87a. As a result switch 113 opens thereby deenergizing relay coil R17. When relay coil R17 is deenergized, switch 109 is opened and motor M17 is deenergized and stops.

As a result of shaft 105 being rotated 3.5°, cam 88 moves the rotor of transformer S36 a proportional amount and inserts into the lateral channel through contacts 106a, 107a a signal which commands a 3.5° bank of the helicopter in the proper direction to cause the helicopter to circle about the target area.

As the helicopter circles the target, the relative wind angle is constantly increasing. When the relative wind angle has attained a magnitude of 105°, the helicopter is downwind of the target area and a left or right turn must be negotiated into the wind. According to the flight pattern if the first turn was a left turn, then the turn into the wind must be a right turn; and conversely if the first turn was a right turn, the turn into the wind is a left turn.

In any case relay coil R18 is energized to operate switches 106, 107 to change them to the opposite position from that shown in FIG. 5, and switches command signal source from transformer S36 to transformer S30 to supply the lateral channel through conductors 113 with a signal commanding a turn into the wind. When the turn is complete, cam 89 causes relay coil T1 to be energized through contact 89a. After a 12 second time delay contacts 95 close and power is supplied to switch boxes 44 and 45. Switch boxes 44 and 45 operate to switch in approach air-speed generator 35 and approach altitude signal generator 34 in a manner identical to that discussed in relation to the condition of a wind angle less than plus or minus 20°.

In the approach mode the signals supplied the lateral channel by the approach mode computer 43 are coupled to the lateral vertical gyro 14 as shown in FIG. 3. The signals are algebraically added to any bank signal present in gyro 14 and the resultant signal results in a deviation of vertical pointer 17.

When the helicopter descends to an altitude of 50 feet, approach altitude signal generator 34 supplies a signal to switch boxes 46 and 47, thereby inserting doppler radar units 36 and 37 into the lateral and longitudinal channels, respectively. Doppler radar units 36 and 37 measure ground speed of the helicopter and generate signals proportional to lateral ground speed and fore and aft ground speed, respectively and accordingly cause vertical and horizontal points 17 and 21 to deviate from center. When the pilot has centered the pointers, the helicopter is in a hover position. When the helicopter has descended to an altitude of 50 feet, the helicopter is ordinarily quite close to the target area. The helicopter is then easily flown slowly to the hover spot by observing range indicator 33.

When the helicopter is in a hover position with zero ground speed, the hover mode is initiated. The hover altitude signal generator 38, which generates a signal proportional to a 50 foot altitude, replaces signal generator 34 and serves as an input to altitude error detector 74 of the collective pitch channel when switch box 45 is operated. The bug 27 instructs the pilot to maintain the hover altitude. At the same time, the sonar cable dunks a sonar detecting device into the water. The sonar cable is equipped with lateral and fore and aft movement detectors 58 and 59 which transmit signals proportional to ground speed to the vertical pointer 17 and horizontal pointer 21, respectively. These detectors 58 and 59 replace the lateral and longitudinal channels when switch boxes 48 and 49 are manually operated. Deviation of the pointers 17 and 21 instructs the pilot to maintain zero ground speed. When switch box 51 is operated a wind direction signal generator 50 feeds a signal proportional to wind direction directly into the rudder channel and cuts the connection to the combining circuit 13. When bug 20 deviates from center as a result of a change in the wind direction, the indicated instruction to the pilot is to push one or the other rudder pedal to maintain the helicopter headed directly into the wind. In this mode doppler units 36 and 37 are disengaged from vertical and horizontal pointers 17 and 21 and not used for measuring ground speed but may be used to measure wind velocity.

The selection of modes may be accomplished in any convenient manner as, for example, by a panel having push-buttons to operate the appropriate switches contained in switch boxes 41, 44, 45, 46, 47, 48, 49, and 51. Switching in the approach mode, however, is automatic as previously disclosed.

Therefore, the helicopter integrated director equipment of this invention results in one integrated system with a central indicator which presents visual commands to a helicopter pilot which specifically instruct him, even when flying blind, to follow a precisely programed course from takeoff to final hover position on an ASW sonar dunking mission.

It should be understood, of course, that the foregoing disclosure relates to only a preferred embodiment of the invention and that modifications obviously may be made therein without departing from the spirit and the scope of the invention as set forth in the appended claims.

What is claimed is:

1. A helicopter integrated flight command system for presenting flight directions to a helicopter pilot for maintaining the helicopter on a programed flight pattern from takeoff to a final hover position, comprising in combination: a centrally located flight director, said centrally located director comprising, vertical pointer means, horizontal pointer means, altitude bug means, rudder bug means, and range indicator means; first means generating a signal proportional to distance from a hover position connected to said range indicator means whereby said range indicator means indicates said distance from a hover position; second means providing a signal proportional to deviation from a desired altitude connected to said altitude bug means whereby said altitude bug means indicates said altitude deviation; third means generating a signal proportional to deviation from a desired airspeed connected to said horizontal pointer means whereby said horizontal pointer means indicates said airspeed deviation; combining circuit means; input means connected to said combining circuit means providing an input to said combining circuit means proportional to airspeed of the helicopter; said combining circuit means including first means providing a first signal and a second signal representative of deviation from a desired heading of the helicopter wherein said first signal of said combining circuit decreases as said airspeed increases and said second signal of said combining circuit increases as said airspeed increases, said combining circuit including second means providing a third signal and a fourth signal representative of skid of the helicopter wherein said third signal of said combining circuit decreases as said airspeed increases and said fourth signal of said combining circuit increases as said airspeed increases, first circuit means connected in said combining circuit means providing a first output signal proportional to the algebraic sum of said first and fourth signals of said combining circuit means, second circuit means connected in said combining circuit means providing a second output signal proportional to the algebraic sum of said second and third signals of said combining circuit; conductor means connecting said first output signal to said rudder bug means and said second output signal to said vertical pointer means whereby said heading deviation and said skid of the helicopter are indicated as interrelated functions of airspeed.

2. A helicopter integrated flight director system for directing a helicopter pilot throughout a programed flight pattern from takeoff to a hover position, comprising in combination: a central flight director, said flight director including range indicator means, horizontal pointer means, altitude bug means, vertical pointer means, and rudder bug means; first means providing a signal proportional to distance from a target connected to said range indicator means wherein said range indicator displays distance from the target; longitudinal channel means including first means providing a signal proportional to actual airspeed of the helicopter, second means providing a signal proportional to a desired airspeed, speed error detector means connected to said first and second means comparing said actual airspeed signal with said desired airspeed signal to provide an output signal proportional to deviation of the helicopter from said desired airspeed, third means connecting said output signal proportional to airspeed deviation to said horizontal pointer means whereby said horizontal pointer means indicates said airspeed deviation; collective pitch channel means including first means providing a signal proportional to actual altitude of the helicopter, second means providing a signal proportional to a desired altitude, altitude error detector means connected to said first and second means comparing said actual altitude signal with said desired altitude signal to provide an output signal proportional to deviation of the helicopter from said desired altitude, third means connecting said output signal proportional to altitude deviation to said altitude bug means whereby said altitude bug indicates said altitude deviation; lateral channel means including first means providing a signal proportional to actual heading of the helicopter, second means providing a signal proportional to a desired heading, heading error detector means connected to said first and second means comparing said actual heading signal with said desired heading signal to provide an output signal proportional to deviation of the helicopter from said desired heading, third means providing a signal proportional to skid of the helicopter, combining circuit means connected to said heading error detector means receiving said output signal proportional to heading deviation as a first input and connected to said third means receiving said skid signal as a second input, fourth means connected to said combining circuit means providing an input to said combining circuit means proportional to said actual airspeed of the helicopter, said combining circuit means including first means providing a first signal and a second signal representative of said heading deviation wherein said first signal decreases as said airspeed increases and said second signal increases as said airspeed increases, said combining circuit means including second means providing a third signal and a fourth signal representative of said skid wherein said third signal decreases as said airspeed increases and said fourth signal increases as said airspeed increases, first circuit means connected in said combining circuit means providing a first output signal proportional to the algebraic sum of said first and fourth signals, second circuit means connected in said combining circuit means providing a second output signal proportional to the algebraic sum of said second and third signals, conductor means connecting said first output signal to said rudder bug means and said second output signal to said vertical pointer means whereby said heading deviation and said skid of the helicopter are indicated as interrelated functions of airspeed.

3. A helicopter integrated flight director system for directing a helicopter pilot throughout a programed flight pattern from takeoff to a hover position, comprising in combination: a central flight director including range indicator means, horizontal pointer means, altitude bug means, vertical pointer means, and rudder bug means; first means providing a signal proportional to distance from a target connected to said range indicator means wherein said range indicator means displays distance from the target; longitudinal channel means including first means providing a signal proportional to actual airspeed of the helicopter, second means providing a signal proportional to a desired airspeed, speed error detector means connected to said first and second means comparing said actual airspeed signal with said desired airspeed signal to provide a signal proportional to deviation of the helicopter from said desired airspeed, pitch gyro means generating a signal proportional to pitch of the helicopter connected to said speed error detector means, said pitch gyro means providing an output signal proportional to the algebraic sum of said pitch signal and said airspeed deviation signal, third means connecting said output signal proportional to said algebraic sum to said horizontal pointer means whereby said horizontal pointer means indicates said airspeed deviation; collective pitch channel means including first means providing a signal proportional to actual altitude of the helicopter, second means providing a signal proportional to a desired altitude, altitude error detector means connected to said first and second means comparing said actual altitude signal with said desired altitude signal to provide an output signal proportional to deviation of the helicopter from said desired altitude, third means connecting said output signal proportional to altitude deviation to said altitude bug means whereby said altitude bug means indicates said altitude deviation; lateral channel means including first means providing a signal proportional to actual heading of the helicopter, second means providing a signal proportional to a desired heading, heading error detector means connected to said first and second means comparing said actual heading signal with said desired heading signal to provide an output signal proportional to deviation of the helicopter from said desired heading, third means providing a signal proportional to skid of the helicopter, combining circuit means connected to said heading error detector means receiving said output signal proportional to heading deviation as a first input and connected to said third means receiving said skid signal as a second input, fourth means connected to said combining circuit means providing an input to said combining circuit means proportional to said actual airspeed of the helicopter, said combining circuit means including first means providing a first signal and a second signal representative of said heading deviation wherein said first signal decreases as said airspeed increases and said second signal increases as said airspeed increases, said combining circuit means including second means providing a third signal and a fourth signal representative of said skid of the helicopter wherein said third signal decreases as said airspeed increases and said fourth signal increases as said airspeed increases, first circuit means connected in said combining circuit means providing a first output signal proportional to the algebraic sum of said second and third signals, bank gyro means generating a signal proportional to bank of the helicopter connected to said first circuit means said bank gyro means providing a second output signal proportional to the algebraic sum of said bank signal and said first output signal, second circuit means connected in said combining circuit means providing a third output signal proportional to the algebraic sum of said first and fourth signals, conductor means connecting said second output signal to said vertical pointer means whereby said vertical pointer means indicates heading deviation of the helicopter compensated for skid, rudder channel means connecting said third output signal to said rudder bug means whereby said rudder bug means indicates skid of the helicopter compensated for heading deviation.

4. The system of claim 3 wherein: said longitudinal channel further comprises cable means generating a signal proportional to fore and aft movement of the helicopter, switching means for selectively connecting said cable means or said speed error detector means to said horizontal pointer means; said lateral channel means further comprises a cable means generating a signal proportional to lateral movement of the helicopter, switching means for selectively connecting said cable means or said pitch gyro means to said vertical pointer means; said rudder channel further comprises a wind direction generator generating a signal representative of wind direction, switching means for selectively switching said combining circuit or said wind direction generator to said rudder bug means; said collective pitch channel second means providing a signal proportional to a desired altitude further comprises a first generator means generating a signal proportional to a desired cruise altitude and a second generator means generating a signal proportional to a desired hover altitude, switching means for selectively connecting said first generator means or said second generator means to said altitude error detector means.

5. The system of claim 3 wherein: said longitudinal channel second means providing a signal proportional to a desired airspeed further comprises a first generator means generating a signal proportional to a desired cruise airspeed and a second generator means generating a signal proportional to a desired approach airspeed, switching means for selectively connecting said first generator means or said second generator means to said speed error detector means; said collective pitch channel second means providing a signal proportional to a desired altitude further comprises a first generator means generating a signal proportional to a desired cruise altitude and a second generator means generating a signal proportional to a desired rate of descent of the helicopter, switching means for selectively connecting said first generator means or said second generator means to said altitude error detector means.

6. The system of claim 5 wherein: said lateral channel means further comprises a lateral ground speed doppler radar device providing a signal proportional to lateral ground speed of the helicopter, switching means for selectively connecting said lateral doppler radar device or said bank gyro means to said vertical pointer means; said longitudinal channel means further comprises a longitudinal ground speed doppler radar device providing a signal proportional to forward ground speed of the helicopter, switching means for selectively connecting said longitudinal doppler radar device or said pitch gyro means to said horizontal vertical pointer means.

7. The system of claim 3 wherein: said lateral channel means further comprising approach mode computer means having an input representative of wind angle relative to the helicopter, start means energizing said approach mode computer to operate when the helicopter is a predetermined distance from the target, said approach mode computer means including first computer means providing a first 90° turn command signal responsive to a relative wind angle greater than 20°, first means connecting said first computer means to said vertical pointer means whereby said vertical pointer means commands a first 90° turn of the helicopter, second computer means, second means inserting an input into said second computer means representative of actual helicopter heading, said second computer responsive to completion of said first 90° turn of the helicopter to provide a circle command signal, third means connecting said second computer means to said vertical pointer means whereby said vertical pointer means commands a circling maneuver by the helicopter, third computer means providing a second 90° turn command signal responsive to a relative wind angle of 105°, fourth means connecting said third computer means to said vertical pointer means whereby said vertical pointer means command a second 90° turn of the helicopter.

8. The system of claim 7 wherein: said longitudinal channel second means providing a signal proportional to a desired airspeed further comprising a first generator means generating a signal proportional to a desired cruise airspeed and a second generator means generating a signal proportional to a desired approach airspeed, first switching means for selectively connecting said first generator means or said second generator means to said speed error detector means, said first switching means connected to said third computer means responsive to said second 90° turn signal to connect said second generator means of said longitudinal channel means to said speed error detector means; said collective pitch channel second means providing a signal proportional to a desired cruise altitude and a second generator means generating a signal proportional to a desired rate of descent of the helicopter, second switching means for selectively connecting said first generator means or said second generator means to said altitude error detector means, said second switching means connected to said third computer means responsive to said second 90° turn signal to connect said second generator means of said collective pitch channel means to said altitude error detector means.

9. The system of claim 8 wherein: said lateral channel means further comprises a lateral ground speed doppler radar device providing a signal proportional to lateral ground speed of the helicopter, third switching means for selectively connecting said lateral doppler radar device or said bank gyro means to said vertical pointer means, said third switching means connected to said second generator means of said collective pitch channel means to connect said lateral doppler radar device to said vertical pointer means when said second generator means generates a signal proportional to a predetermined altitude; said longitudinal channel means further comprises a longitudinal ground speed doppler radar device providing a signal proportional to forward ground speed of the helicopter, fourth switching means for selectively connecting said longitudinal doppler radar device or said pitch gyro means to said horizontal pointer means, said fourth switching means connected to said second generator means of said collective pitch channel means to connect said longitudinal doppler radar device to said horizontal pointer means when said second generator means generate a signal proportional to a predetermined altitude.

10. Helicopter integrated director equipment for directing a pilot through a four mode, programed flight pattern consisting of a manual cruise mode, dead reckoning mode, approach mode, and hover mode, comprising in combination: a central director means, lateral channel means, first means inserting a desired heading signal into said lateral channel means, second means inserting an actual heading signal into said lateral channel means, said lateral channel means including error detector means connected to said first and second means comparing said desired heading signal with said actual heading signal, said heading error detector means having an output proportional to heading error, combining circuit means connected to said heading error detector means to receive said heading error output as an input, third means inserting into said combining circuit means an input proportional to skid, fourth means inserting into said combining circuit means an input proportional to actual airspeed, said combining circuit means combining said heading error and skid inputs as a function of airspeed to provide a skid adjusted heading error signal and a heading error adjusted skid signal, lateral channel vertical gyro means generating a signal proportional to bank, said gyro means connected to said combining circuit means receiving said skid adjusted heading error signal as an input, said gyro means having an output proportional to the algebraic sum of said bank signal and said skid adjusted heading error signal connected to said central director means whereby the pilot is directed to correct said heading error, rudder channel means connected to said combining circuit means for receiving as an input said heading error adjusted skid signal, said rudder channel connecting said heading error adjusted skid signal to said central director meter whereby the pilot is directed to correct said skid, pitch channel means, fifth means inserting an actual airspeed signal into said pitch channel, said pitch channel including speed error detector means connected to said fourth and fifth means comparing said desired airspeed signal with said actual airspeed signal, said airspeed error detecting means having an output proportional to speed error, pitch vertical gyro means generating a signal proportional to pitch connected to said speed error detector means, said pitch vertical gyro means having an output proportional to the algebraic sum of said speed error output and said pitch output, first connecting means connecting said pitch vertical gyro means to said central indicator meter whereby the pilot is directed to correct said speed error, collective pitch channel means, sixth means inserting an actual altitude signal into said collective pitch channel, seventh means inserting a desired altitude signal into said collective pitch channel, said collective pitch channel means including altitude error detector means connected to said fifth and sixth means comparing said actual altitude with said desired altitude, said altitude error detector means having an output proportional to altitude error, second connecting means connecting said altitude error detector means to said central indicator meter whereby the pilot is directed to correct said altitude error.

11. The system of claim 10: wherein said combining circuit further comprises first resolver means including a rotor coil and first and second stator coils, first input means connected to said rotor coil of said first resolver means supplying an electrical signal to said rotor coil of said first resolver means proportional to deviation from a desired heading of the helicopter; a second resolver means including a rotor coil and first and second stator coils, second input means connected to said rotor coil of said second resolver means supplying an electrical signal to said rotor coil of said second resolver means proportional to skid of the helicopter; first circuit means connecting said first stator coil of said first resolver means and said second stator coil of said second resolver means in electrical series, second circuit means connecting said second stator coil of said first resolver means and said first stator coil of said second resolver means in electrical series; third input means connected to said rotor coils of said first and second resolver means rotating said rotor coils an amount proportional to airspeed of the helicopter, said first stator coil of said first resolver means having maximum voltage induced therein when said airspeed input is minimum and minimum voltage inducted therein when said airspeed input is maximum, said first stator coil of said second resolver means having maximum voltage induced therein when said airspeed input is minimum and minimum voltage induced therein when said airspeed input is maximum, said first circuit means having an output proportional to the algebraic sum of the voltages induced in said first stator coil of said first resolver means and said second stator coil of said second resolver means, said second circuit means having an output proportional to the algebraic sum of the voltages induced in said second stator coil of said first resolver means and said first stator coil of said second resolver means.

12. In a combining circuit for use in a helicopter integrated director system, first resolver means including a rotor coil and first and second stator coils, first input means connected to said rotor coil of said first resolver means supplying an electrical signal to said rotor coil of said first resolver means proportional to deviation from a desired heading of the helicopter; a second resolver means including a rotor coil and first and second stator coils, second input means connected to said rotor coil of said second resolver means supplying an electrical signal to said rotor coil of said second resolver means proportional to skid of the helicopter; first circuit means connecting said first stator coil of said first resolver means and said second stator coil of said second resolver means in electrical series, second circuit means connecting said second stator coil of said first resolver means and said first stator coil of said second resolver means in electrical series; third input means connected to said rotor coils of said first and second resolver means rotating said rotor coil an amount proportional to airspeed of the helicopter, said first stator coil of said first resolver means and said second resolver having maximum voltage induced therein when said airspeed input is minimum and minimum voltage induced therein when said airspeed input is maximum, said second stator coil of said first resolver means and said second resolver means having minimum voltage induced therein when said airspeed input is minimum and maximum voltage induced therein when said airspeed input is maximum, said first circuit means having an output proportional to the algebraic sum of the voltages induced in said first stator coil of said first resolver means and said second stator coil of said second resolver means, said second circuit means having an output proportional to the algebraic sum of the voltages induced in said second stator coil of said first resolver means and said first stator coil of said second resolver means.

References Cited in the file of this patent
UNITED STATES PATENTS

| | | |
|---|---|---|
| 2,567,212 | Klopp et al. | Sept. 11, 1951 |
| 2,908,902 | Gray et al. | Oct. 13, 1959 |
| 3,005,185 | Cumming et al. | Oct. 17, 1961 |